(12) United States Patent
Milan

(10) Patent No.: US 7,258,572 B2
(45) Date of Patent: Aug. 21, 2007

(54) MODULAR DC POWER STEP DOWN ADAPTER

(76) Inventor: Henry Milan, 1709 Apple Ridge Ct., Rochester Hills, MI (US) 48306

(*) Notice: Subject to any disclaimer, the term of this patent is extended or adjusted under 35 U.S.C. 154(b) by 0 days.

(21) Appl. No.: 10/938,217

(22) Filed: Sep. 9, 2004

(65) Prior Publication Data

US 2005/0081070 A1    Apr. 14, 2005

Related U.S. Application Data

(60) Provisional application No. 60/501,363, filed on Sep. 9, 2003.

(51) Int. Cl.
*H01R 11/00*   (2006.01)

(52) U.S. Cl. .................. 439/502; 439/623; 307/80; 307/119; 363/142

(58) Field of Classification Search ........ 363/141–146, 363/16–20; 307/64–66, 86, 80, 119, 38; 439/502, 505, 506, 289, 923, 956
See application file for complete search history.

(56) References Cited

U.S. PATENT DOCUMENTS

| | | | |
|---|---|---|---|
| 4,611,878 A | 9/1986 | Hall et al. | |
| 4,659,161 A | 4/1987 | Holcomb | |
| 4,741,708 A | 5/1988 | Yoshida | |
| 4,824,402 A | 4/1989 | Sarimachi | |
| 5,532,524 A * | 7/1996 | Townsley et al. | 307/64 |
| 5,573,425 A * | 11/1996 | Morisawa et al. | 439/502 |
| 6,030,258 A | 2/2000 | Fumikura | |
| 6,376,938 B1 * | 4/2002 | Williams | 307/150 |
| 6,716,047 B2 | 4/2004 | Milan | |
| 6,791,853 B2 * | 9/2004 | Afzal et al. | 363/142 |

* cited by examiner

Primary Examiner—Rajnikant B. Patel
(74) Attorney, Agent, or Firm—Butzel Long

(57) ABSTRACT

An apparatus for providing DC power to a portable computer operating at a source voltage and a peripheral device operating at step down voltage having a lower magnitude has an input cord for connection to an AC/DC converter that supplies the source voltage, a first output cord for connection to the peripheral device, and a second output cord for connection to the portable computer. An adapter circuit lights an indicating LED when the DC source voltage is connected to the input cord, generates the DC step down voltage to the first output cord and lights another indicating LED and generates the DC source voltage to the second output cord. The adapter circuit includes a switch for selecting between a first magnitude step down voltage lower than a magnitude of the source voltage and second magnitude lower than a magnitude of the source voltage and higher than the first magnitude.

20 Claims, 3 Drawing Sheets

MODULAR DC POWER STEP DOWN ADAPTER

CROSS-REFERENCE TO RELATED APPLICATION

This application claims the benefit of U.S. provisional patent application Ser. No. 60/501,363 filed Sep. 9, 2003.

BACKGROUND OF THE INVENTION

The present invention relates in general to a computer power supply system for providing DC power to a computer and an accessory of a computer system. More particularly, the present invention deals with a low voltage, direct current power supply adapter to provide different voltage DC power to a laptop computer and to a USB hub.

Computer systems typically include a computer and one or more peripheral devices. Most portable computers are powered by batteries providing approximately 19 volts DC power. These computers can be operated, and the batteries recharged, from the high voltage AC power outlets found in homes, office buildings, etc. utilizing an external AC/DC converter that coverts the AC power into the required low voltage DC power. Peripheral devices such as USB hubs typically are powered by 5 to 7 volts DC and also utilize an external AC/DC converter that coverts the AC power into the required low voltage DC power. These converters have a housing with an input cord terminated by a standard AC plug for connection to a wall outlet and an output cord terminated by a standard male connector that cooperates with a female connector on the associated computer or peripheral device. Thus, the computer and the peripheral each have an external AC/DC converter that must be plugged into a wall outlet or power strip. The result is wasted workspace for the two converter housings, duplicate cords that must be routed and the requirement for two electrical outlets. Also, the mobility of a portable computer with a peripheral device is complicated by the additional AC/DC converter required for the operation of both.

SUMMARY OF THE INVENTION

The present invention concerns an apparatus for providing DC power to a portable computer operating at a DC source voltage and a peripheral device operating at DC step down voltage having a magnitude lower than a magnitude of the source voltage. The apparatus includes an input cord terminated by an input connector adapted to electrically connect to a source of the DC source voltage, a first output cord terminated by a first output connector adapted to connect to a power input connector of the peripheral device, and a second output cord terminated by a second output connector adapted to connect to a power input connector of the portable computer. A housing having a pair of apertures formed therein encloses an adapter circuit connected to the input cord and the first and second output cords. The adapter circuit includes a pair of LED's each positioned in an associated one of said housing apertures. When the input connector is connected to the source of the DC source voltage, the adapter circuit generates the DC step down voltage at the first output connector and lights one of the LED's, and generates the DC source voltage at said second output connector and lights another of the LED's.

The adapter circuit includes a switch having a first position in which the adapter circuit generates the step down voltage with a first magnitude lower than a magnitude of the source voltage and having a second position in which the adapter circuit generates the step down voltage with a second magnitude lower than a magnitude of the source voltage and higher than the first magnitude. The adapter circuit includes the pair of Zener diodes connected to the switch for voltage regulation at the first and second magnitudes.

Most particularly, the present invention deals with a low voltage, DC power supply system wherein a high voltage, AC power source is supplied to an AC/DC converter, and a DC source voltage is output to an adapter circuit for stepping down the input DC source voltage and for providing a stepped down low voltage, DC power source of different voltage magnitudes to a portable computer and a USB hub.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The co-pending U.S. provisional patent application Ser. No. 60/501,363filed Sep. 9, 2003, is incorporated herein by reference.

Figure 1:
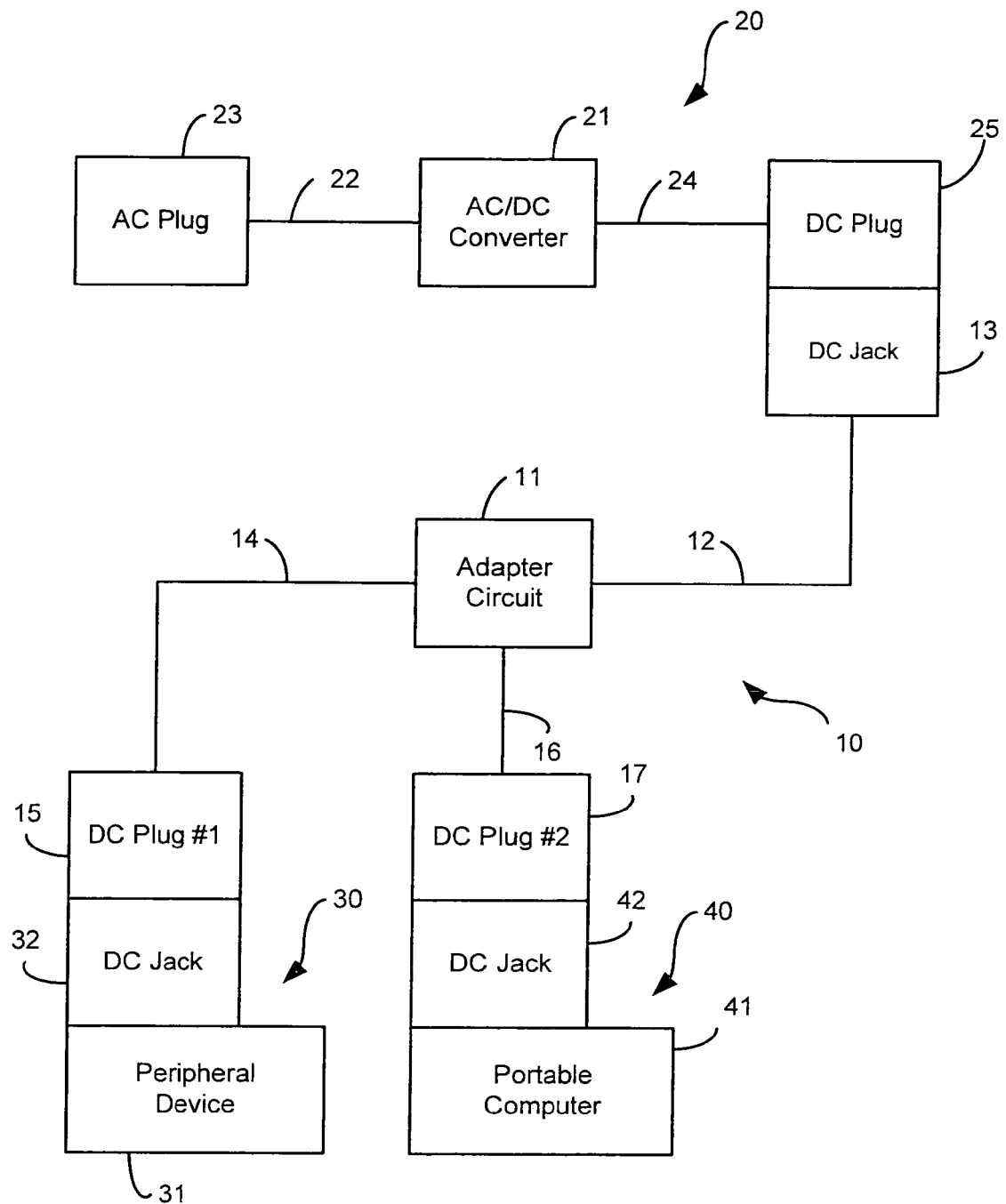
FIG. 1 is a schematic block diagram of a step down adapter in accordance with the present invention connected to a computer system.

FIG. 1 shows a modular DC power step down adapter 10 according to the present invention for providing two low voltage, direct current power outputs to a pair of electrical devices. A housing 11 encloses an adapter circuit (not shown) that is connected to an input cord 12 extending from the housing and terminated at a free end by an input connector such as a DC jack 13. The adapter circuit is connected to a first output cord 14 extending from the housing 11 and terminated at a free end by a first output connector such as a DC plug 15. The adapter circuit also is connected to a second output cord 16 extending from the housing 11 and terminated at a free end by a second output connector such as a DC plug 17.

The adapter 10 receives DC power from an AC/DC converter 20 of the type typically provided with a portable computer. For example, a Sony Model ADP-120 MB converter generates 19.5V DC with a maximum current of 6.14 A. The converter 20 has a housing 21 that encloses an AC/DC conversion circuit (not shown) that is connected to a power input cord 22 extending from the housing and terminated at a free end by an input connector such as an AC plug 23. The conversion circuit also is connected to a DC output cord 24 extending from the housing 21 and terminated at a free end by an output connector such as a DC plug 25. The converter 20 generates DC power at the plug 25 with a source voltage magnitude of approximately nineteen volts (19V). The DC plug 25 mates with the DC jack 13 to deliver the DC source voltage generated by the converter 20 to the step down adapter 10.

A peripheral device 30, such as a universal serial bus (USB) hub for example, has a housing 31 enclosing electrical circuitry (not shown) requiring a different DC voltage than the 19V source voltage provided by the converter 20. The hub circuitry is connected to a power input connector such as a DC jack 32 that is mounted to the housing 31 for connection to an AC/DC converter (not shown, but similar to the converter 20) that generates DC power with a step down voltage magnitude of approximately five volts (5V). The adapter 10 generates the required 5V DC step down voltage at the first DC plug 15 that mates with the DC jack 32.

A portable computer 40 has a housing 41 enclosing electrical circuitry (not shown) that requires the 19V DC power generated by the converter 20. The computer circuitry is connected to a power input connector such as a DC jack 42 that is mounted to the housing 41 for connection to the DC plug 25. However, the adapter 10 generates the required 19V DC source voltage at the second DC plug 17 that mates with the DC jack 42.

Figure 2:
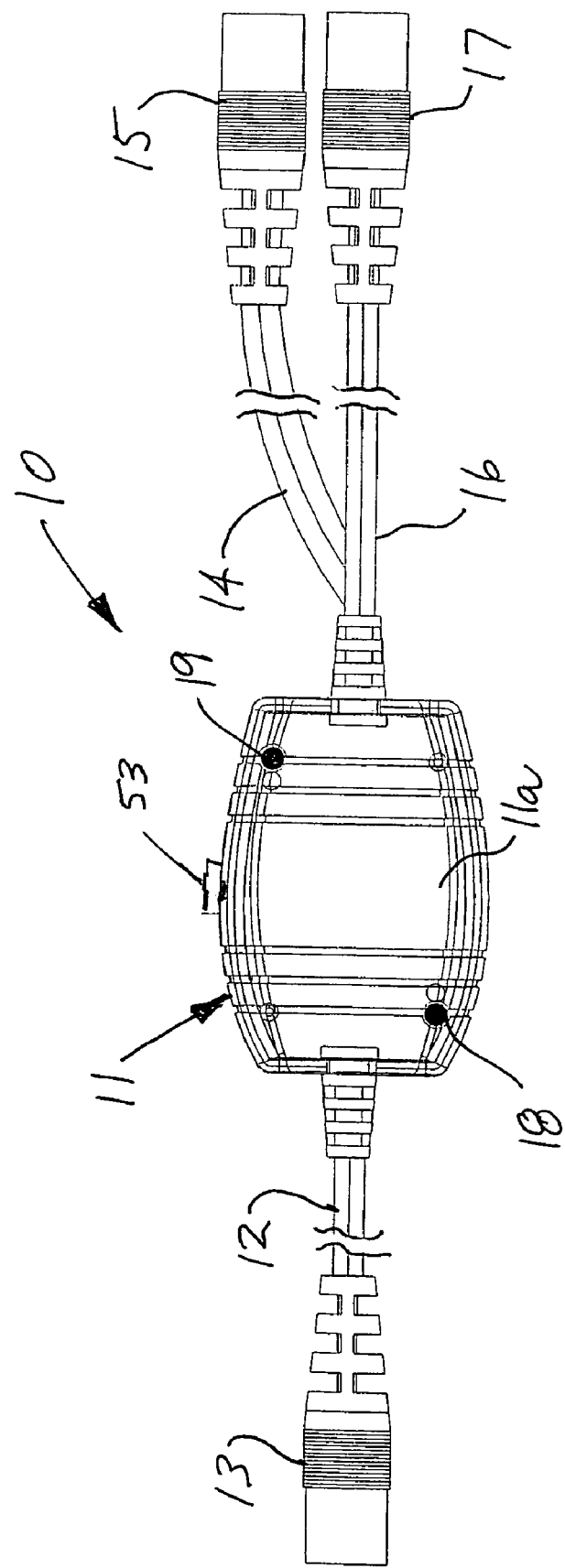
FIG. 2 is a top plan view of the adapter shown in FIG. 1.

The modular DC power step down adapter 10 is shown in FIG. 2 in a top view wherein the housing 11 can be made from any suitable material, such as a molded plastic, and has a hollow interior for enclosing the adapter circuit that is mounted on a printed circuit board (not shown). The housing 11 can be formed of two or more parts that are fastened together after the printed circuit board is mounted therein. The cords 12, 14 and 16 each has two conductors encapsulated in a suitable insulating material such as PVC. The cords 12, 14 and 16 are electrically and mechanically connected to the printed circuit board and have a standard strain relief construction at the housing 11. The DC jack 13 and the DC plugs 15 and 17 can have a similar encapsulation.

An upper surface 11a of the housing 11 can have a pair of apertures formed therein for exposing a pair of LED power indicators 18 and 19 mounted on the printed circuit board. The LED 18 is positioned at one side of the surface 11a near the end of the housing from which the cord 12 extends. The LED 19 is positioned at an opposite side of the surface 11a near the end of the housing from which the cords 14 and 16 extend. The LEDs 18 and 19 can emit light of any suitable color such as green. As explained below, the LED 18 indicates when the 19V DC power from the converter 20 is connected to the DC jack 13 and the LED 19 indicates when the 5V DC power is available from the DC plug 15.

Figure 3:
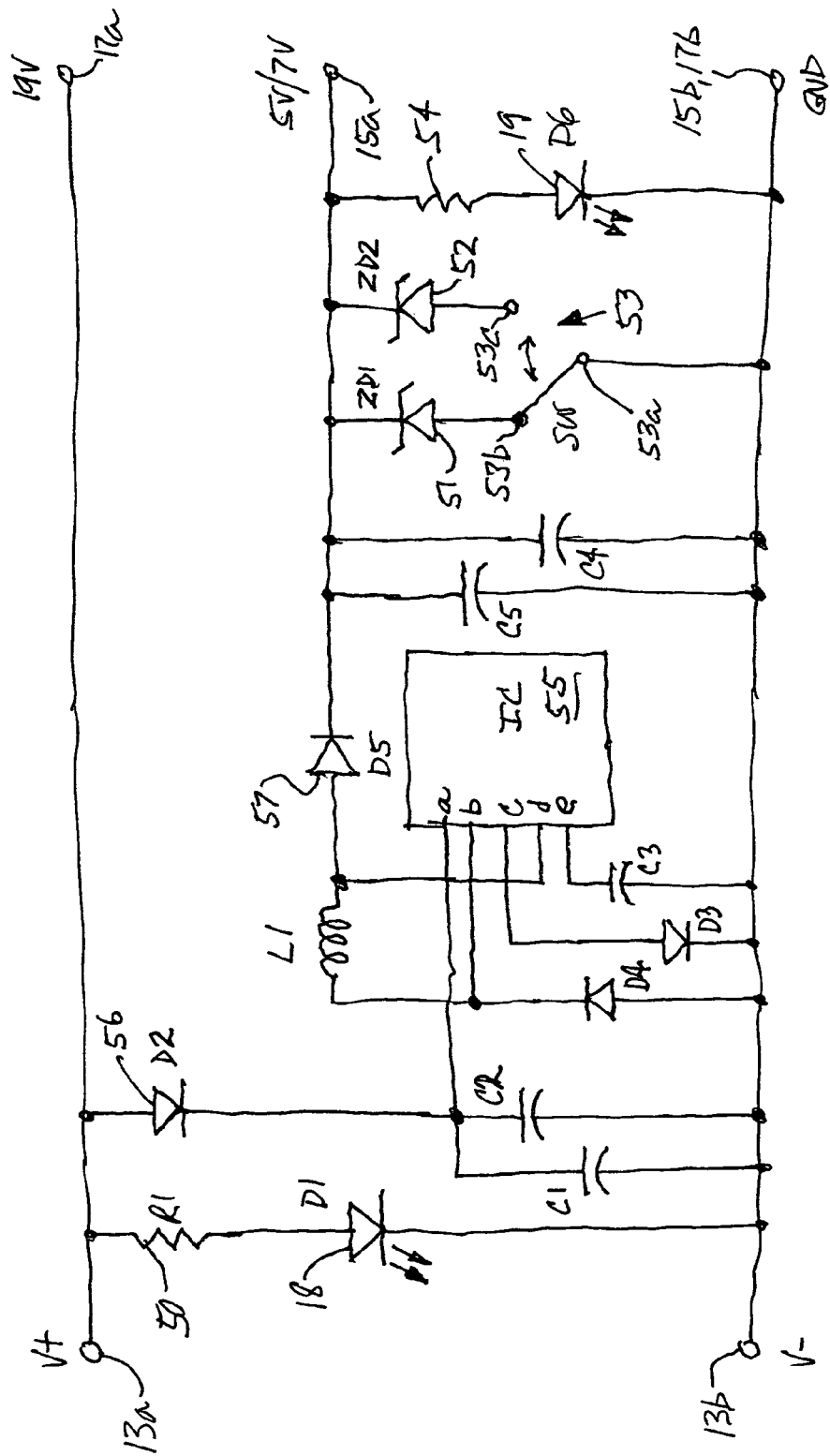
FIG. 3 is a schematic circuit diagram of the adapter circuit in the housing of the adapter shown in FIG. 2.

There is shown in FIG. 3 a schematic circuit diagram of the adapter circuit inside the housing 11. Input terminals 13a and 13b represent the DC jack 13 for connection to positive polarity "V+" and a negative polarity "V−" respectively of the DC source voltage generated at the DC plug 25. A resistor 50 is connected in series with the LED 18 between the terminals 13a and 13b to indicate when the 19V DC power is connected to the DC jack 13. Thus, if the terminal 13b is the reference or ground terminal, then "V+" is at 19V DC at the terminal 13a. The terminal 13a is connected to an output terminal 17a and the terminal 13b is connected to an output terminal 17b. The terminals 17a and 17b represent the second DC plug 17 for providing the 19V DC source voltage to the portable computer 40 at the DC jack 42.

The first DC plug 15 is represented by output terminals 15a and 15b. The terminal 15b is connected to the input terminal 13b to be at ground potential. The terminal 15a is connected to the cathode of each of a first Zener diode 51 and a second Zener diode 52. A switch 53, which can be a slide switch as shown in FIG. 2, has a first contact 53a that is connected to the circuit ground potential. As shown in FIG. 3, in a first position of the switch 53 the first contact 53a is electrically connected to a second contact 53b that is connected to an anode of the first Zener diode 51. The diode 51 functions as a voltage regulator to maintain the 5V DC step down voltage at the terminal 15a. The switch 53 can be moved to a second position wherein the first contact 53a is connected to a third contact 53c that is connected to an anode of the second Zener diode 52. The diode 52 functions as a voltage regulator to maintain a different step down voltage at the terminal 15a; for example, a 7V DC step down voltage that may be required to operate some peripheral devices. A resistor 54 is connected in series with the LED 19 between the terminals 15a and 15b to indicate when the step down voltage DC power is being generated at the DC jack 15.

A step down voltage regulator 55 has an input terminal 55a connected through a diode 56 to receive the 19V DC power (V+) from the input terminal 13a. The voltage regulator can be any commercially available integrated circuit device that operates in the required input and output voltage range. The voltage regulator 55 has an output terminal 55d connected through a diode 57 to the output terminal 15a to deliver DC power at a voltage slightly above 7V DC (for example, 8V). The output power from the terminal 55d is regulated at 5V DC when the switch 53 is in the first position and is regulated at 7V DC when the switch 53 is in the second position.

The adapter 10 described above can be modified to operate with any magnitude DC source voltage and provide any desired magnitude step down DC output voltage. Furthermore, the jack 13 and the plugs 15 and 17 can be selected to mate with any types of standard connectors represented by the DC plug 25 and the DC jacks 32 and 42.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An apparatus for providing DC power comprising:
    a portable computer operating at a DC source voltage;
    a peripheral device operating at DC step down voltage having a magnitude lower than a magnitude of the source voltage;
    an input connector adapted to electrically connect to a source of the DC source voltage;
    a first output connector adapted to connect to a power input connector of the peripheral device;
    a second output connector adapted to connect to a power input connector of the portable computer; and
    an adapter circuit connected to said input connector and said first and second output connectors whereby when said input connector is connected to the source of the DC source voltage, said adapter circuit receives the DC source voltage and generates the DC step down voltage at said first output connector and generates the DC source voltage at said second output connector.

2. The apparatus according to claim 1 wherein said adapter circuit includes an indicator that lights when said input connector is connected to the source of the DC source voltage.

3. The apparatus according to claim 1 wherein said adapter circuit includes an indicator that lights when the DC step down voltage is generated at said first output connector.

4. The apparatus according to claim 1 wherein the step down voltage is 5V DC.

5. The apparatus according to claim 1 wherein the step down voltage is 7V DC.

6. The apparatus according to claim 1 wherein said adapter circuit includes a Zener diode for regulating the magnitude of the step down voltage.

7. The apparatus according to claim 1 wherein said adapter circuit includes a switch having a first position in which said adapter circuit generates the step down voltage with a first magnitude lower than a magnitude of the source voltage and having a second position in which said adapter circuit generates the step down voltage with a second magnitude lower than a magnitude of the source voltage and higher than the first magnitude.

8. The apparatus according to claim 7 wherein said adapter circuit includes a pair of Zener diodes connected to said switch for regulating the first and second magnitudes of the step down voltage.

9. The apparatus according to claim 1 including an input cord connecting said input connector to said adapter circuit a first output cord connecting said first output connector to said adapter circuit and a second output cord connecting said second output connector to said adapter circuit.

10. The apparatus according to claim 1 including a housing enclosing said adapter circuit.

11. An apparatus for providing DC power comprising:
a portable computer operating at a DC source voltage;
a peripheral device operating at DC step down voltage having a magnitude lower than a magnitude of the source voltage;
an input cord terminated by an input connector adapted to electrically connect to a source of the DC source voltage;
a first output cord terminated by a first output connector adapted to connect to a power input connector of the peripheral device;
a second output cord terminated by a second output connector adapted to connect to a power input connector of the portable computer;
a housing having a pair of apertures formed therein; and
an adapter circuit enclosed in said housing and connected to said input cord and said first and second output cords, said adapter circuit including a pair of LED's each positioned in an associated one of said apertures, whereby when said input connector is connected to the source of the DC source voltage, said adapter circuit receives the DC source voltage and generates the DC step down voltage at said first output connector and lights one of said LED's and said adapter circuit generates the DC source voltage at said second output connector and lights another of said LED's.

12. The apparatus according to claim 11 wherein said adapter circuit includes a switch having a first position in which said adapter circuit generates the step down voltage with a first magnitude lower than a magnitude of the source voltage and having a second position in which said adapter circuit generates the step down voltage with a second magnitude lower than a magnitude of the source voltage and higher than the first magnitude.

13. The apparatus according to claim 11 wherein said housing is formed of a plastic material.

14. An apparatus for providing DC power to portable devices comprising:
an input connector adapted to electrically connect to a source of a DC source voltage;
an adapter circuit having an input connected to said input connector for receiving the DC source voltage, said adapter having a first output and a second output whereby when said input connector is connected to the source of the DC source voltage, said adapter circuit generates a first DC voltage at said first output having a magnitude lower than a magnitude of the DC source voltage and generates a second DC voltage at said second output having a magnitude greater than said first DC voltage;
a first output connector connected to said first output and adapted to connect to a power input connector of a first portable device; and
a second output connector connected to said second output and adapted to connect to a power input connector of a second portable device, wherein said adapter circuit includes a pair of Zener diodes connected to a switch for regulating the first and second magnitudes of the step down voltage.

15. The apparatus according to claim 14 wherein said adapter circuit includes an indicator that lights when said input connector is connected to the source of the DC source voltage.

16. The apparatus according to claim 14 wherein said first DC voltage is at least 5V DC.

17. The apparatus according to claim 14 wherein said input connector includes an input cord having a DC connector at one end for connecting to the source of the DC voltage and being connected at an opposite end to said adapter circuit input.

18. The apparatus according to claim 14 wherein said first and second output connectors include at least one output cord having one end connected to at least one of said adapter circuit first and second outputs and an opposite end having a DC connector adapted to connect to at least one of the first and second portable devices.

19. The apparatus according to claim 14 wherein said first output connector includes a first output cord having one end connected to said adapter circuit first output and an opposite end having a DC connector adapted to connect to the first portable device, and said second output connector includes a second output cord having one end connected to said adapter circuit second output and an opposite end having a DC connector adapted to connect to the second portable device.

20. The apparatus according to claim 14 including a housing enclosing said adapter circuit.

* * * * *